(12) United States Patent
Haye

(10) Patent No.: US 10,830,091 B2
(45) Date of Patent: Nov. 10, 2020

(54) DISTRESS DETECTION IN DYNAMICALLY AND THERMALLY COUPLED SYSTEMS

(71) Applicant: United Technologies Corporation, Farmington, CT (US)

(72) Inventor: Sheridon Everette Haye, Mansfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 194 days.

(21) Appl. No.: 15/864,075

(22) Filed: Jan. 8, 2018

(65) Prior Publication Data

US 2019/0211703 A1   Jul. 11, 2019

(51) Int. Cl.
*F02C 7/06* (2006.01)
*F01D 21/00* (2006.01)
(Continued)

(52) U.S. Cl.
CPC ....... *F01D 21/003* (2013.01); *G05B 23/0254* (2013.01); *G06N 5/048* (2013.01); *F02C 7/06* (2013.01); *F02C 7/264* (2013.01); *F05D 2220/323* (2013.01); *F05D 2270/707* (2013.01); *G05B 15/02* (2013.01); *G05B 2219/33295* (2013.01); *G05B 2219/37328* (2013.01); *G06Q 10/20* (2013.01)

(58) Field of Classification Search
CPC ......... F01D 21/003; G06N 5/048; F02C 7/06; F05D 2270/707
See application file for complete search history.

(56) References Cited

U.S. PATENT DOCUMENTS 7,134,323 B1   11/2006   Discenzo
7,415,328 B2 *  8/2008   Volponi ............. G05B 23/0254
                                                        477/30
(Continued)

FOREIGN PATENT DOCUMENTS

WO   2017/142737 A1   8/2017

OTHER PUBLICATIONS

European Patent Office, Extended European Search Report, Application No. 19150768.0-1204, dated Jun. 12, 2019 (11 pp.).
(Continued)

*Primary Examiner* — Mohamed Charioui
(74) *Attorney, Agent, or Firm* — Cantor Colburn LLP

(57) ABSTRACT

A distress detection system includes a data repository operable to collect sensor data from a monitored system. The distress detection system also includes an analysis system with a processing system operable to access a first parameter of a first system of the monitored system from the data repository and access a second parameter of the first system of the monitored system from the data repository. The processing system is also operable to apply fuzzy reasoning rules to evaluate a combination of the first parameter and the second parameter to determine an in-range interaction with respect to a second system of the monitored system as fuzzy metric data points, classify a component of the second system as being in distress based on comparing the fuzzy metric data points to a limit line, and assert a component distress indicator responsive to classifying the component of the second system as being in distress.

16 Claims, 6 Drawing Sheets

(51) Int. Cl.
*G06N 5/04* (2006.01)
*G05B 23/02* (2006.01)
F02C 7/264 (2006.01)
G05B 15/02 (2006.01)
G06Q 10/00 (2012.01)

(56) References Cited

U.S. PATENT DOCUMENTS

| | | |
|---|---|---|
| 7,769,507 B2 | 8/2010 | Volponi et al. |
| 8,112,368 B2 | 2/2012 | Eklund et al. |
| 8,417,410 B2 | 4/2013 | Moeckly et al. |
| 8,676,436 B2 | 3/2014 | Raimarckers et al. |
| 9,020,766 B2 | 4/2015 | Von Herzen et al. |
| 9,581,086 B2 * | 2/2017 | Tiwari ............... G05B 23/0283 |
| 10,443,509 B2 * | 10/2019 | Kay ..................... F01D 17/085 |
| 2005/0021212 A1 * | 1/2005 | Gayme .................. G06N 5/048 |
| | | 701/99 |
| 2013/0019125 A1 | 1/2013 | Almubarak |
| 2014/0088766 A1 | 3/2014 | Tang et al. |
| 2017/0114660 A1 | 4/2017 | James |
| 2017/0235857 A1 | 8/2017 | Haye |

OTHER PUBLICATIONS

Schlechtingen, Meik et al., "Wind turbine condition monitoring based on SCADA data using normal behavio models. Part 2: Application Examples", Applied Soft Computing, Elsevier, Amsterdam, NL, vol. 14, Oct. 8, 2013 (14 pp.).

* cited by examiner

DISTRESS DETECTION IN DYNAMICALLY AND THERMALLY COUPLED SYSTEMS

BACKGROUND

The subject matter disclosed herein generally relates to measurement systems and, more particularly, to a method and an apparatus for distress detection in dynamically and thermally coupled systems.

Complex machines are composed of multiple systems that are intrinsically dependent. Health monitoring of complex machines typically focuses on systems or subsystems that are linked mechanically, electrically, or by a fluid. Cross coupling effects between systems of a machine can be difficult to accurately model, and thus health monitoring is typically partitioned into discrete blocks that map to particular systems or subsystems. For instance, parameters such as oil temperature and oil pressure may be used to determine a lubrication system health status; however, the impact of such parameters on other systems within a machine may not be readily apparent.

BRIEF DESCRIPTION

According to one embodiment, a distress detection system includes a data repository operable to collect sensor data from a monitored system. The distress detection system also includes an analysis system with a processing system operable to access a first parameter of a first system of the monitored system from the data repository and access a second parameter of the first system of the monitored system from the data repository. The processing system is also operable to apply fuzzy reasoning rules to evaluate a combination of the first parameter and the second parameter to determine an in-range interaction with respect to a second system of the monitored system as fuzzy metric data points, classify a component of the second system as being in distress based on comparing the fuzzy metric data points to a limit line, and assert a component distress indicator responsive to classifying the component of the second system as being in distress.

In addition to one or more of the features described above or below, or as an alternative, further embodiments may include where the first system is thermally cross-coupled to the second system absent a mechanical linkage, an electrical linkage, and a fluid linkage between the first system and the second system.

In addition to one or more of the features described above or below, or as an alternative, further embodiments may include where the monitored system is a gas turbine engine.

In addition to one or more of the features described above or below, or as an alternative, further embodiments may include where the first system is a lubrication system and the component of the second system is a burner.

In addition to one or more of the features described above or below, or as an alternative, further embodiments may include where the first parameter is a main oil pressure and the second parameter is a main oil temperature.

In addition to one or more of the features described above or below, or as an alternative, further embodiments may include where observations of the first parameter and the second parameter are constrained based on determining that the first parameter and the second parameter are both within a valid operating range.

In addition to one or more of the features described above or below, or as an alternative, further embodiments may include where the first parameter and the second parameter are normalized with respect to a third parameter.

In addition to one or more of the features described above or below, or as an alternative, further embodiments may include where a maintenance action is triggered responsive to the component distress indicator being asserted.

In addition to one or more of the features described above or below, or as an alternative, further embodiments may include where assertion of the component distress indicator is prevented based on detection of a fault condition associated with the first system.

In addition to one or more of the features described above or below, or as an alternative, further embodiments may include where the first parameter and the second parameter are derived from separate sensors of the monitored system.

According to another embodiment, a method of distress detection in a monitored system is provided. The method includes accessing, by an analysis system, a first parameter of a first system of the monitored system. The analysis system accesses a second parameter of the first system of the monitored system. Fuzzy reasoning rules are applied to evaluate a combination of the first parameter and the second parameter to determine an in-range interaction with respect to a second system of the monitored system as a plurality of fuzzy metric data points. A component of the second system is classified as being in distress based on comparing the fuzzy metric data points to a limit line. A component distress indicator is asserted responsive to classifying the component of the second system as being in distress.

A technical effect of the apparatus, systems and methods is achieved by using data fusion and fuzzy logic to detect distress in dynamically and thermally coupled systems of the same machine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
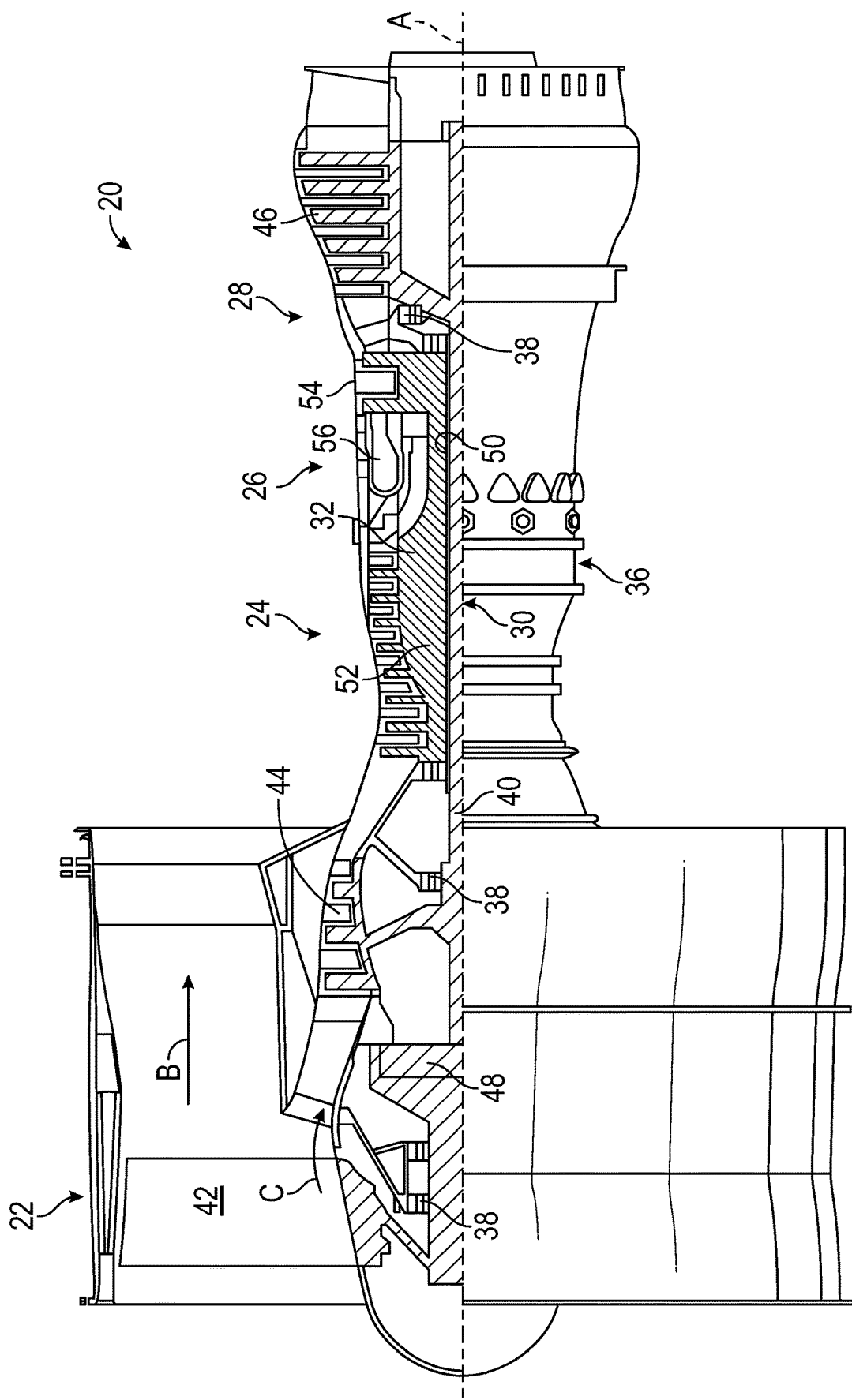
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

The gas turbine engine 20 is one type of complex machine that includes multiple systems with physical interactions between the systems. Embodiments use parameters that are measure in one system to determine the diagnostic state of another coupled system with no or limited system observability. A fuzzy logic fusion approach can be used to identify deterioration of one system based upon the parameters of one or more other systems within the machine. For example, systems that do not share a mechanical linkage, an electrical linkage, or a fluid linkage may be thermally coupled within a machine. In systems with reduced observability, detection of distress or degraded operation of a system may be determined through data fusion of two or more parameters of a different system and observation of changes while the parameters are still considered to be within acceptable operating ranges. The approaches disclosed herein are not limited to gas turbine engines and may be applied to a variety of monitored systems as further described in reference to FIG. 2.

Figure 2:
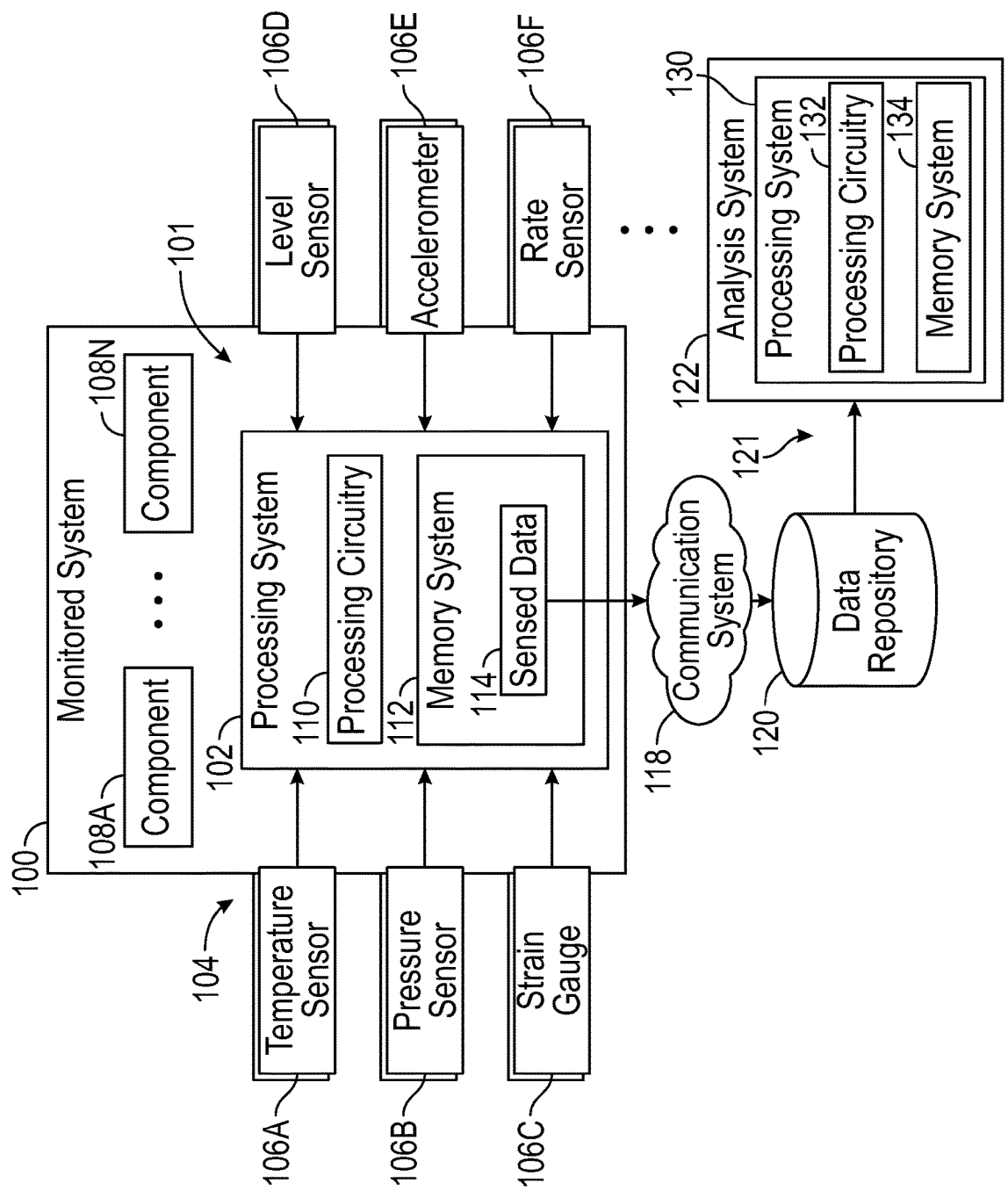
FIG. 2 is a block diagram of a monitored system, in accordance with an embodiment of the disclosure.

Referring now to the drawings, FIG. 2 illustrates a monitored system 100 that is observed by a monitoring system 101 that includes a processing system 102 coupled to a sensor system 104. The sensor system 104 includes a plurality of sensors 106 that are configured to collect diagnostic and operational data related to the monitored system 100. The monitored system 100 can be any type of machine or system comprised of a plurality of components 108A-108N subject to detectable and predictable failure modes.

For example, the monitored system 100 can be an engine, a vehicle, a heating, ventilating, and air conditioning (HVAC) system, an elevator system, industrial machinery, or the like. For purposes of explanation, embodiments are primarily described with respect to an engine system of an aircraft as the monitored system 100, such as the gas turbine engine 20 of FIG. 1. In the example of FIG. 2, the sensors 106 monitor a plurality of parameters of the monitored system 100, such as one or more temperature sensors 106A, pressure sensors 106B, strain gauges 106C, level sensors 106D, accelerometers 106E, rate sensors 106F, and the like.

The processing system 102 can include processing circuitry 110 and a memory system 112 to store data and instructions that are executed by the processing circuitry 110. The executable instructions may be stored or organized in any manner and at any level of abstraction, such as in connection with a controlling and/or monitoring operation of the sensor system 104. The processing circuitry 110 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 112 may include random access memory (RAM), read only memory (ROM), or other electronic, optical, magnetic, or any other computer readable medium onto which is stored data and algorithms in a non-transitory form. The processing system 102 is operable to access sensor data from the sensor system 104 and store values as sensed data 114 in the memory system 112. The processing system 102 can also interface with a communication system 118 to send and receive data values, such as sensed data 114, to a data repository 120. The processing system 102 can include other interfaces (not depicted), such as various outputs, wireless communication interfaces, and the like. The sensed data 114 can be snapshots or more densely populated data stream readings from the sensor system 104.

The data repository 120 can be subdivided or distributed between multiple databases and/or locations. In embodiments, the data repository 120 is accessible by an analysis system 122. The combination of the data repository 120 and the analysis system 122 may be referred to as a distress detection system 121. In some embodiments, the distress detection system 121 also includes one or more of the sensors 106 and may include the processing system 102. The analysis system 122 can be in close physical proximity to the monitored system 100 or may be remotely located at a greater distance. The analysis system 122 may also interface with a number of other instances of the data repository 120 associated with other instances of the monitored system 100 (e.g., a fleet of monitored systems 100). Similar to the monitoring system 101, the analysis system 122 includes a processing system 130 with processing circuitry 132 and a memory system 134 operable to hold data and instructions executable by the processing circuitry 132. In some embodiments, the processing system 130 is a workstation, a mainframe, a personal computer, a tablet computer, a mobile device, or other computing system configured as disclosed herein, while the processing system 102 may be an embedded computing system of the monitored system 100 operable to perform real-time data acquisition and analysis. Further, the processing system 130 can be distributed between multiple computing devices.

Figure 3:
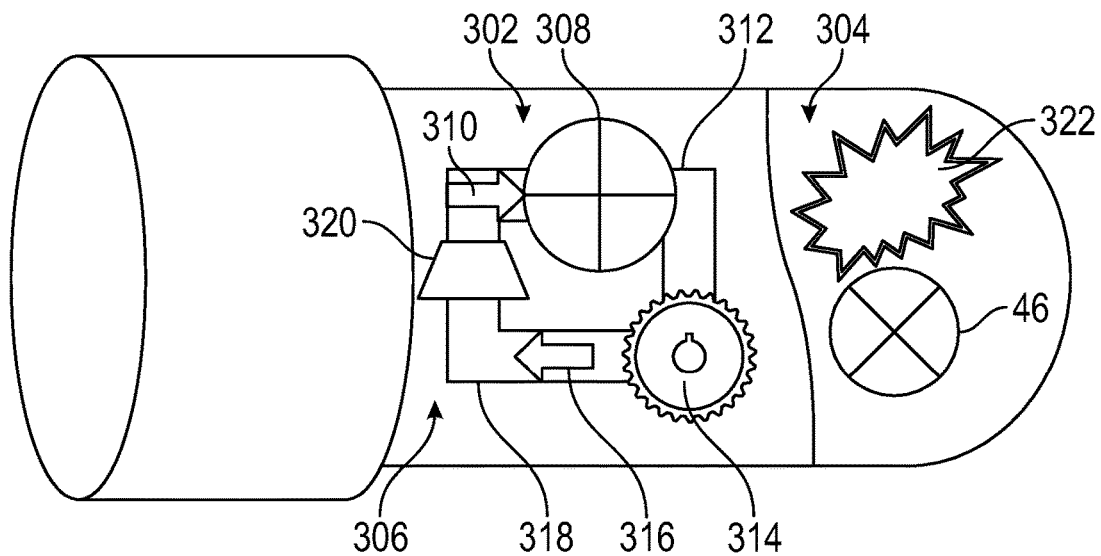
FIG. 3 is a schematic illustration of systems of a gas turbine engine, in accordance with an embodiment of the disclosure.

Referring now to FIG. 3, a plurality of systems of the gas turbine engine 20 of FIG. 1 is depicted schematically. In the example of FIG. 3, the systems can include a lubrication system 302, a fuel combustion system 304, and other such systems (not depicted). The lubrication system 302 can include a lubrication circuit 304 operable to circulate a lubricant, such as oil, between a plurality of components. In the example of FIG. 3, a pump 308 urges a lubricant flow 310 as a pressurized lubricant flow 312 to one or more components in need of lubrication, such as a gear system 314. The gear system 314 can be part of the geared architecture 48 of FIG. 1, part of a gearbox (not depicted), or other such rotatable components or accessories of the gas turbine engine 20 of FIG. 1. A return lubricant flow 316 from the gear system 314 can return lubricant to a tank (or sump) 318. Operation of the pump 308 can urge lubricant from the tank 318 through one or more other lubrication system components, such as a filter 320, in the lubrication flow 310. It will be understood that additional elements can be incorporated within the lubrication system 302, such as various sensors to detect temperature, pressure, level, debris, and the like.

The fuel combustion system 304 can include at least one burner 322 of the combustor 56 of FIG. 1. Fuel flow to the burner 322 and combustion within the burner 322 is substantially independent of the lubrication system 302. Thermal energy released by combustion of fuel in the burner 322 can impact rotational speed of components of the gas turbine engine 20 of FIG. 1, such as low pressure turbine 46. Rotation of the low pressure turbine 46 can provide energy to rotate the pump 308 and/or gear system 314. However, fuel flow in the fuel combustion system 304 and lubricant flow in the lubrication system 302 are not directly linked and may be independently controlled. It will be understood that the fuel combustion system 304 can include additional elements beyond those depicted in FIG. 3, such as a fuel pump, fuel tank, and various fuel related sensors.

In embodiments, cross coupling of systems is observed through parameter fusion, where changes in parameter values in a system reflect effective changes in health of a cross-coupled system. Cross-coupled system effects may not be manifested in a single parameter. Evidence of deterioration of cross-coupled systems can become more apparent as multiple parameters are combined. As one example, a dependency matrix (D-matrix) can be utilized to account for the interaction between systems and fault propagation mechanisms. The D-matrix achieves this goal by performing dependency modeling in a discrete setting. This can be achieved by listing each sensor parameter of interest, isolating each failure as independent entities and then enumerating the likelihood of the failure being detected by the sensor system 104 of FIG. 2. The D-matrix can be used identify observable and unobservable failure modes based on available sensors 106 of the sensor system 104.

TABLE 1

D-Matrix for machine failure modes of mechanical and lubrication systems

| | OilQ | MOP | MOT | ODMR | OilDP | OilC | Vibe |
|---|---|---|---|---|---|---|---|
| Leak | −1 | −1 | 1 | 0 | 0 | 1 | 0 |
| Spall | 0 | 0 | 0 | 1 | 1 | 0 | 1 |
| Seal Loss | 0 | 0 | 0 | 1 | 1 | 0 | 0 |
| GD | 0 | 0 | 1 | 1 | 0 | 1 | 0 |
| MOPSF | 0 | −1 | 0 | 1 | 0 | 0 | 1 |
| HSD | 0 | −1 | 1 | 0 | 0 | 1 | 0 |
| Coking | −1 | 1 | 0 | 0 | 0 | 0 | 0 |
| TC | −1 | −1 | 1 | 0 | 0 | 1 | 0 |
| RD | −1 | −1 | 1 | 0 | 0 | 1 | 1 |
| FPE | −1 | −1 | 1 | 1 | 1 | 1 | 1 |

The D-matrix shown in Table 1 reflects common failure modes for mechanical and lubrication systems. Each row of Table 1 lists a failure type and each column indicates a measured parameter that may be used for failure detection. Failure types can include a leak, spall, seal loss, gear distress (GD), main oil pressure shaft failure (MOPSF), hot section distress (HSD), coking, tip clearance (TC), rotor distress (RD), and fuel pump efficiency (FPE). Examples of monitored parameters include oil quality (OilQ), main oil pressure (MOP), main oil temperature (MOT), oil debris monitor rate (ODMR), oil filter delta pressure (OilDP), and vibration (Vibe). In the example of Table 1, a value of '−1' indicates there is a measurable system impact and the change is evident in a decrease in the value of the parameter as it relates to the specified failure mode. A value of '0' indicates that there is no known system impact therefore no measurable change will be observed by the parameter as it relates to the specified failure mode. A value of '1' indicates there is a measurable system impact and the measurable change is evident in an increase in the value of the parameter as it relates to the specified failure mode. A good practice for diagnostics, prognostics and health management system design is to begin by identifying possible failure modes. These modes are presented in a D-matrix format as illustrated in Table 1. Table 1 shows a subset of the failure modes specific to mechanical and lubrication systems, and a full D-matrix can include additional possible failure modes beyond those provided in this example. One or more failure modes of the D-matrix may exist outside of a typical lubrication system regime, such as 'burner distress', which although considered independent of the lubrication system, is shown to be observable by lubrication system parameters. This observation and subsequent system health assessment enables cross-coupled system parameters to be used to identify distress or degradation of the burner even though oil in the lubrication system is not consumed by the burner.

Although not directly connected mechanically or by a shared fluid, the lubrication system performance can have observable interactions with other systems. The main impact to lubrication properties of interest, e.g., pressure and temperature of the oil, is thermal and pressure loading. As oil absorbs more heat or is exposed to increasing loading, the properties change to accommodate the increased energy demand. This change can be indicated by the changes in temperature and pressure. Consider a closed lubrication system that has a detectable leak. It would be expected that as oil is lost, the system pressure is reduced and an increase in temperature would be observed as the heat exchange demand remains constant but the viscosity index of the oil is reduced. For any system that interacts with the lubrication system, it is possible or likely that additional heat load will be captured by the oil, prompting an increase in temperature and a change in oil viscosity and dynamics that would directly impact the measured oil pressure.

A framework is described herein on which to confirm the expected interaction and to explore the possibility of taking advantage of these interactions by building the structure for fusion analysis of cross-coupled system interaction. The fusion approach can be used to replace and/or improve upon the viewpoint of a skilled analyst. However, unlike a human observer who is advantaged by pre-conditioned inputs and inferences, a significant part of the effort for machine fusion logic is the conditioning required to establish the data for use after acquisition. While there are a number of possible parameters that can be considered, the examples herein are described with respect to main oil temperature and pressure.

A design purpose of oil in a rotating machine is to reduce wear caused by friction and provide an effective heat transfer mechanism. Another critical function of the oil is to provide support to rotating components utilizing a hydrodynamic pressure gradient. The knowledge of a minimum operational oil quantity or a deleterious over quantity is critical in maintaining the health of the machine. An accurate measure of oil level is therefore a means of determining an acceptable oil quantity in the system; however, singularly measuring oil level/quantity does not guarantee that the oil is directed to the intended area(s). A reliable measure of oil pressure gives a clear indication of the ability of the system to work and can act as an indicator to failures that may not otherwise be detected. An example of the above mentioned failure type is a partially blocked tube; this scenario although not detectable by an oil level indication can become apparent by an increased Main Oil Pressure (MOP). This scenario can result in an increased pressure with a reduced flow capacity leading to reduced oil supply, hence increased wear.

Oil pressure is typically measured using a differential pressure method; that is the measured reading is in reference to some other pressure source. For example, the differential pressure can be synonymous to gauge pressure as the atmospheric pressure is the reference point. Measurement technologies span the gamut of modern sensing techniques. As one example, the measurement technology can be a piezo-resistive/piezoelectric device.

A standard gauge pressure measurement can be obtained using conventional sensing equipment that is appropriately placed. The overall health of the system can then be correlated to the oil pressure reading. For pressure indicative failure modes, it is expected that as the system degrades, the pressure reading will indicate deterioration proportionally. A fielded system takes advantage of these levels of deterioration to declare maintenance directives. These directives or levels of alert can then be used to coordinate resources and asset allocation driven by safety and operationally efficiency. For example, a 'yellow' alert can be made to indicate a first level threshold crossing, to which is assigned a maximum duration of operation before servicing, while a 'Red' alert can be made to indicate impending failure and immediate halt to machine operation.

With the advent of advanced data acquisition and storage systems, patterns and trends, previously fleeting are now accessible, retrievable and available for advanced data processing algorithms to be applied. These advancements however cannot replace the venerable method of "knowing" the machine, its related dynamics, identifying the highest likely failure possibilities, and then delineating the mechanism of likely paths to failure. There is a wide band of pressure values over the speed range of interest. Wide variation in readings reduces the effectiveness of the MOP raw readings for monitoring purposes and can lead to false alarms.

An empirical model—derived from test data regression—of the form shown by Equation 1, can predict the oil pressure as a function of rotating speed and oil temperature.

$$MOP_{model} = Coeff(i)Speed - Coeff(i+1)OIT \quad (1)$$

Application of the model represented by Equation 1 can reduce the data point scatter significantly. This model is useful in that it captures primary effects driven by main oil temperature and rotating speed of a shaft, such as the outer shaft 50 of FIG. 1. By applying the model represented by Equation 1, data point scatter is reduced. With a model representing the dynamics of the system and effectively bounding the response range for specific speeds, advanced analytical diagnostic and prognostic approaches may be developed and applied.

Applying an appropriate model over the operating speed range significantly reduces the data point scatter and can be effective in predicting oil pressure within known constraints. By calculating and tracking the delta between predicted and measured pressure, incipient faults can be identified earlier and emerging catastrophic events identified with higher confidence.

As a further example, temperature measurement is an intuitive and ubiquitous metric used to determine the state of a system. A system in this context can range from the open atmosphere to complex close volume machines, such as gas turbines. The system component temperature of interest can be determined by the issue that is to be monitored. In the case of a gas turbine, one of the main interests is the capability of the oil to transfer heat, provide lubrication and the dynamic support required for rotating structures. A sensing device that responds to changes in the temperature is used in this application. These devices are grouped under the banner commonly called thermometer. These devices often span a wide temperature range and employ a varied set of technologies. The oil operating temperature range is narrow when compared to the normal range of other systems, for instance, in the gas turbine engine 20 of FIG. 1. This gives the opportunity to increase sensor resolution and hence increase the fidelity and observability of subtle changes in the system. This may be the most salient feature in providing further insight into the system dynamics. This feature can be utilized in helping to harness often overlooked indicators in the system.

As with development of pressure monitoring capability, further development of temperature data manipulation can provide the capability to identify system specific changes. A functional monitoring system can use thresholds to confine operation within a safe operational range. Definition of enforceable limits on the oil operating temperature allows desirable tribological properties of the fluid to be maintained.

Temperature limits can comprise of an upper and lower bound, and power dependent limits can be applied. Low oil temperature limits ensure that the oil viscosity is within the range of what is needed to lubricate or provide dynamic support. A high temperature level limit can indicate possible failure modes that include oil loss, lack of circulation due to variation in the pump capability or a blocked system.

Failure modes of a temperature monitored system may not all experience a temperature limit excursion. Some failures can be exhibited as a transient perturbation of temperature—can be above or below the set limit—and dissipate with limited persistence. Other failures may be seen as a sustained low-level response well in the bounds of the upper or lower limit and within the sensor resolution. These indications are often overlooked as noise, or attributed to run to run variation.

For convenience, the viscosity of the oil can be related to nonlinear spring stiffness in a mechanical system. Where as in the mechanical system the non-linear spring stiffness is sensitive to displacement, the viscosity in a fluidic system is sensitive to the heat absorbed as indicated by changes in the oil temperature. A mechanical spring operates within an elastic domain. This elastic domain is defined as the displacement range proportional to the applied force that returns the spring to its original state when the force is removed.

The mechanical spring is permanently deformed if the force applied extends the spring beyond the elastic domain into what is termed the plastic domain. This concept extends to the viscosity of the oil. Within the elastic regime, the oil returns to its useful state after doing work within the designed temperature range. Excursion beyond the set limit of the oil temperature induces the risk of irreversible deformation in the plastic regime with an early loss of functional properties of the oil.

Embodiments operate within the limits of the elastic regime, where range variation of the oil can be used to determine changes in the system that in a traditional system might be overlooked as system variation. These observations can be utilized and combined with another parameter to detect otherwise imperceptible system deterioration.

A thermocouple type device can be utilized with voltage output proportional to the measured temperature. Approaches for temperature monitoring can include the application of high/low limits, speed/power dependent limits and slope trends or step shifts. These data points for a similar power setting can vary wildly. A legacy approach generally is not concerned about this variation but, as stated before, is primarily focused on the oil being within safe operating limits. Therefore, by establishing a limit line that corresponds to the elastic domain of the oil, there would be no flag set for such fluctuation. This is a limit of the legacy approach, the inability to harness the field of data to further probe into the workings of the machine.

To improve the capability to isolate in-range faults and subtle trends, a correction factor can be applied to the oil temperature at a given shaft speed. This correction reduces the parameter variation and a running average defined by Equations 2 and 3 provides further smoothing of the parameter. A delta value can then be calculated between the smoothed, corrected data and the measured unprocessed data. Such processing may result in the clustering of data around speed ranges for some machines. This clustering reduces the intuitive application of trending patterns from visual observation and also is not ideal for applying fusion algorithms.

$$MOT_{model} = Coeff(i)Speed - Coeff(i+1)OIT_{measured} \quad (2)$$

$$\Sigma_{s=1+i} x(s)/n \quad (3)$$

The envelope of operation should be understood in its entirety, as operational 'pinch' points can exist where the system response is strongly influenced by factors outside of the system being measured and requires appropriately adjusted limits.

Component failures are often thought to be incipient by nature hence trendable and once initiated predictable; however, many failures are sudden and catastrophic while others exhibit failure transient parameter change that are insignificant compared to a set limit line.

A pump failure can be incipient due to worn bearings or seals. The failure can also be catastrophic due to a sheared shaft or broken bearing cage. An incipient failure may be a result of excessive component wear in the oil pump. A steady decrease in normalized pressure may be seen, which represents waning output efficiency of the pump. In some instances a catastrophic failure of the pump may appear as a step change observed in both the measured and delta data points.

As a further consideration, coking is the mechanism of forming a residue in the oil flow path when triggering conditions are met. Coking is an incipient process and, as a result, is evident in a gradual sustained increase in MOP. The oil temperature can enter into the plastic range, where the functional properties of the oil are irreversible changed.

The flow of oil in the system can be hindered by varying degrees at different locations by a range of objects. For a blocked system, it is expected that the measured pressure will increase during operation and remain high after shut down for a longer time compared to a nominal engine.

There may be subtle variations in the monitored parameters during a failure mode of interest. The variations can be in-range (below set failure mode detection limits) and within a run-to-run and machine-to-machine variation band. This can provide a unique challenge as the goal of 100% correct detection and 0% false alarms becomes more elusive. To improve the metrics, additional tools not used in traditional monitoring platforms can be used. Embodiments go beyond observing shifts in the trend of a parameter being measured but also align these measurements with other inputs and observations which to the nascent are independent. These relations can be difficult to capture and quantify with a conventional system and when ignored the next acknowledgment is the alert triggered by the electronic monitoring system, losing the opportunity for early detection.

Figure 4:
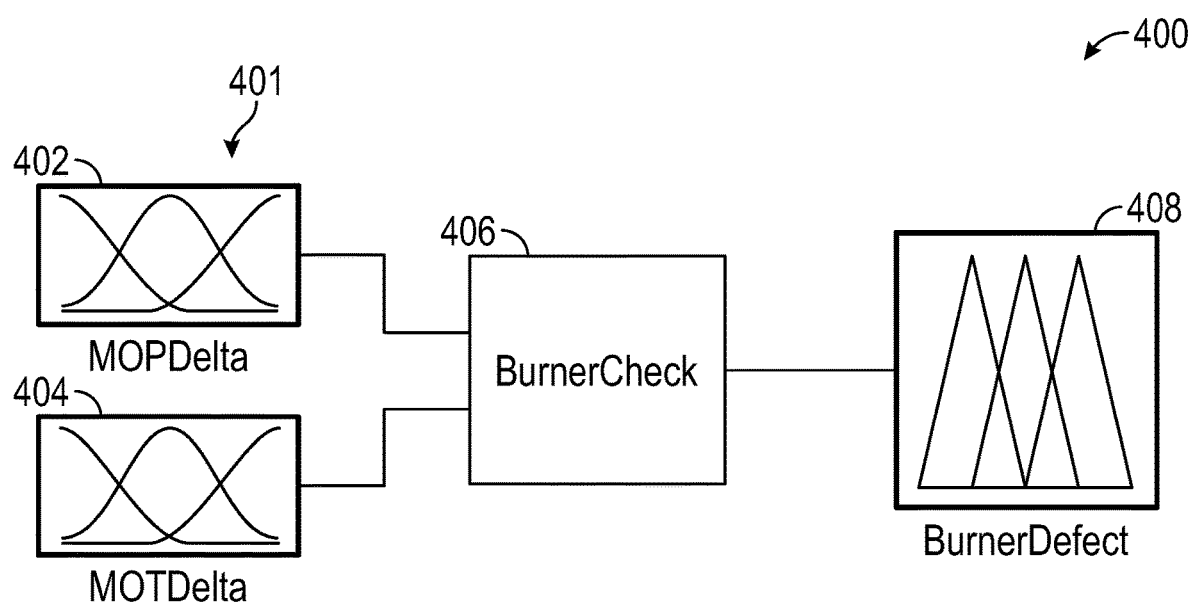
FIG. 4 is a block diagram of a fuzzy fusion structure, in accordance with an embodiment of the disclosure.

In embodiments, a data fusion system can take into account, in-range shifts, tribal knowledge, inferences and correlations to assess the likelihood of early system deterioration. Referring now to FIG. 4, an example of a fuzzy logic structure 400 that may be implemented on the analysis system 122 of FIG. 2 is shown in greater detail. Fuzzy logic provides a way to arrive at a definite conclusion based upon vague, ambiguous, noisy or missing input information. The fuzzy logic approach may attempt to mimic a human logical approach to problem solving. A mathematical model is not required for control or diagnostics, but a heuristic application of a logical approach can be utilized. A complex system can therefore be assessed by applying observations and logical steps without the need of complex modeling. This implies that the level of fuzzy logic accuracy is dependent on the level of system understanding.

The fuzzy structure 400 is divided into three sections, inputs 401, fuzzy reasoning rules 406, and defuzzification 408. The inputs 401 are numerical in nature and are the parameters of interest used in the assessment of the system condition. For this example, the inputs 401 are the main oil pressure delta 402 and main oil temperature delta 404. An independent variable, oil quantity, can also be considered but is not required if controlled for and consistent during analysis.

The fuzzy reasoning rules 406 can evaluate the combined inputs 401 to determine an in-range interaction of the system of interest. In this example, the main oil pressure delta 402 and main oil temperature delta 404 are evaluated against IF statements reflecting conditions that determine system deterioration of a burner. Here, the physics and dynamics of the system are captured at a high level that is coherent to human observation, intuition and physics.

The results of the applied rules to the data are then evaluated to a set number that indicates a pre-determined condition of the system. Here, preconditions for system state are set. In the case of system deterioration, there are numerical limits that align with physical observation. For example, for a part that is failing it is important to set an indicator that shows the difference between "good", "nominal", and "bad" in defuzzification 408. By understanding the dynamics of the system as related to fault progression and condition indicators the system performance indicators will highlight incipient issues even as the degradation occurs within the active parameter's 'healthy' range.

The variation in the main oil pressure delta 402 and main oil temperature delta 404 when observed independently may not set alarms, particularly for a traditional approach, however when coupled, provides a clear indication that goes beyond machine-to-machine variations. Initially, the data suggested a leak as the oil temperature and pressure show deviation from the baseline. As previously mentioned, for a leak, the expectation is an increase in temperature and a decrease in pressure. By looking at the leak progression indicator there is no indication of a progressive leak. This observation then suggests that an agent secondary to the oil system is responsible for the fluctuations observed in these indicators. There are a myriad of possible contributors to the systems results, however by aligning observations from machines with an observed phenomenon to those without, a clear pattern emerges which strongly suggests a correlation between machine lubrication system distress and other systems.

The method as shown can include the ability to detect an in-range fault by coupling (fusing) multiple indicators within operational range to determine the health of the system without intervention from a human observer.

Example results from eight different machines are depicted in FIGS. 5-12. A limit line 500 is shown in FIGS. 5-12 as a horizontal broken line with an intercept at a number of fuzzy metric units to align a flag with failure observations. Observations of a first machine, such as one instance of the gas turbine engine 20 of FIG. 1 are depicted as fuzzy metric data points 502 with respect to time in FIG. 5. Observations of a second machine, such as another instance of the gas turbine engine 20 of FIG. 1 are depicted as fuzzy metric data points 602 with respect to time in FIG. 6. The pattern continues with a third-eighth machines as fuzzy metric data points 702, 802, 902, 1002, 1102, and 1202 in FIGS. 7-12. Choosing the fuzzy metric and limits as shown can provide an intuitive feel of a good component vs. a defective component. For instance, the fuzzy metric data points 602, 702, 802, and 1102 of FIGS. 6, 7, 8, and 11 illustrate a clear excursion of the limit line 500 with a sustained below limit value. The effectiveness of the result can be validated against a known failure that is observable by these methods.

Figure 5:
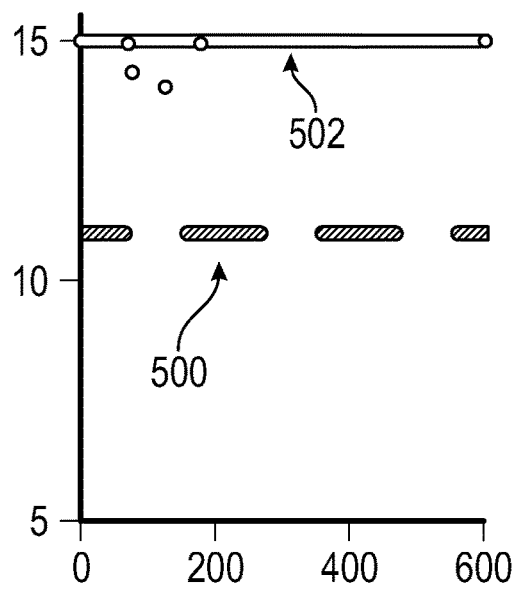
FIG. 5 depicts an example of fusion results of a first machine, in accordance with embodiments of the disclosure.
Figure 6:
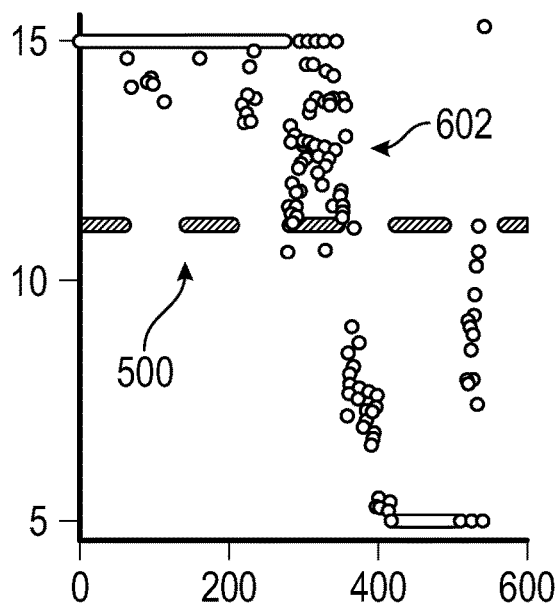
FIG. 6 depicts an example of fusion results of a second machine, in accordance with embodiments of the disclosure.
Figure 7:
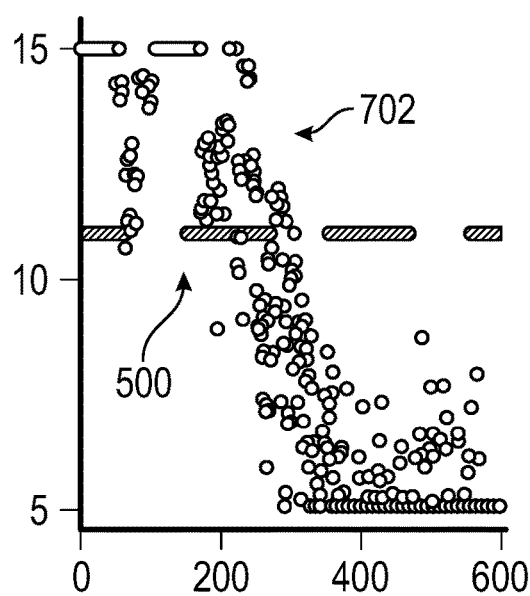
FIG. 7 depicts an example of fusion results of a third machine, in accordance with embodiments of the disclosure.
Figure 8:
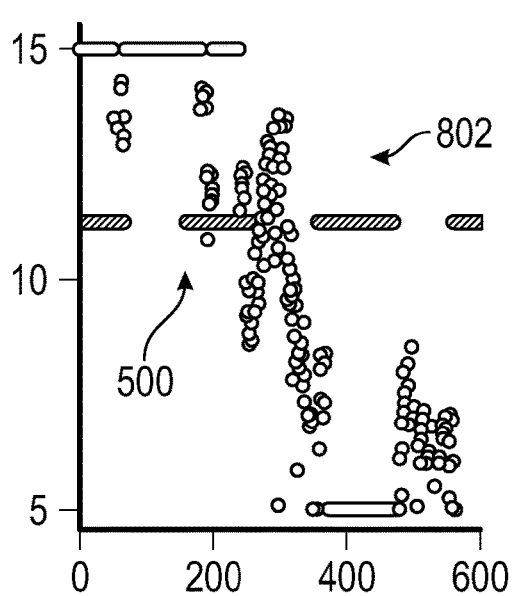
FIG. 8 depicts an example of fusion results of a fourth machine, in accordance with embodiments of the disclosure.
Figure 9:
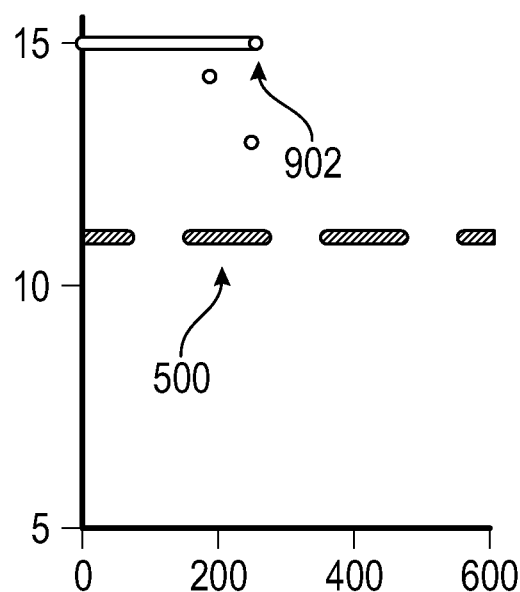
FIG. 9 depicts an example of fusion results of a fifth machine, in accordance with embodiments of the disclosure.
Figure 10:
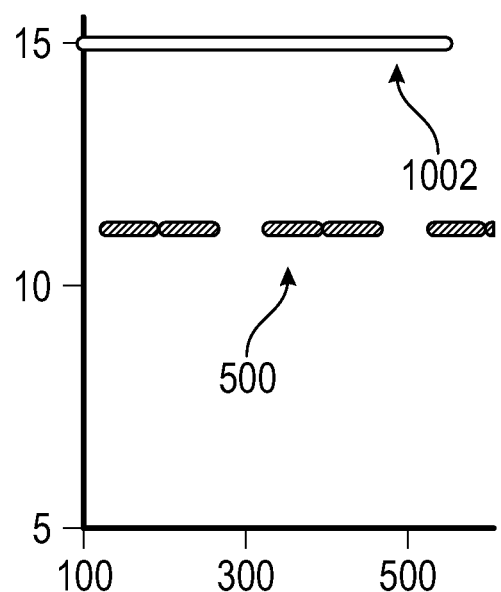
FIG. 10 depicts an example of fusion results of a sixth machine, in accordance with embodiments of the disclosure.
Figure 11:
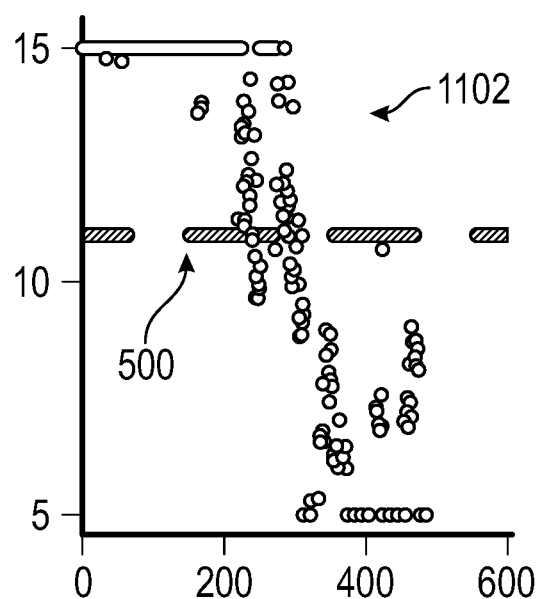
FIG. 11 depicts an example of fusion results of a seventh machine, in accordance with embodiments of the disclosure.
Figure 12:
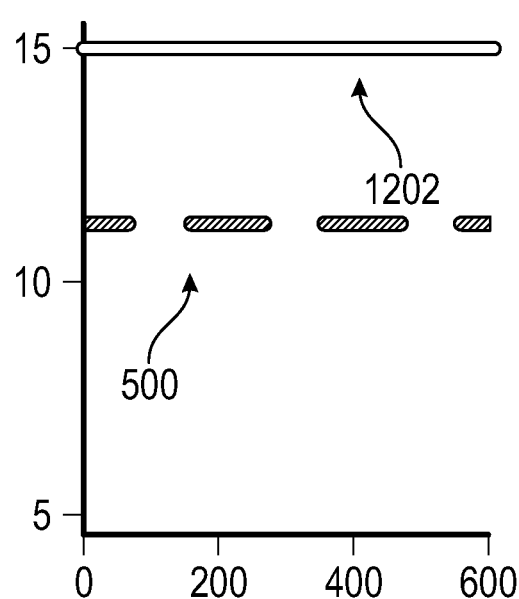
FIG. 12 depicts an example of fusion results of an eighth machine, in accordance with embodiments of the disclosure.

The first and fifth machines of FIGS. 5 and 9 exhibit an early intermittent departure from the 'good' regime. Further, the first machine of FIG. 5 ran to a relative time of 600, while the fifth machine of FIG. 9 ran to relative time of 285 and was taken off line for repair of an unrelated component. Observation of the fifth machine of FIG. 9 indications suggest that the initial stages of component distress had initiated but was not allowed to propagate. The sixth machine of FIG. 10 and the eighth machine of FIG. 12 remained within the 'good' regime with no change over the running time of these machines. The second machine of FIG. 6 shows a precipitous fall in the fuzzy metric data points 602; however, an uptick in the indicator suggests that the component regained the 'good' state. This could be a result of the component being replaced or a change in running condition not reflected in the data set. Similar fluctuations in the fuzzy metric are observed and could also suggest that further tuning may be needed or account taken for inventory of the component change or run condition. When the component of interest is observed for the machines with a clear limit excursion with appreciable persistence i.e., 2nd, $3^{rd}$, $4^{th}$, and $7^{th}$ machines of FIGS. 6, 7, 8, and 11, there is clear alignment between the limit flag being set and a defective component. The same is also true for machines without the defect limit excursion below the limit line 500, the component of interest is deemed good. These results show no misdetection, no false alarms and correct detection. This suggests that detecting a critical fault by fusing parameters initially deemed independent of another system with parameters that are well within the acceptable range of healthy indication can provide a useful detection of system distress before a failure actually occurs.

Figure 13:
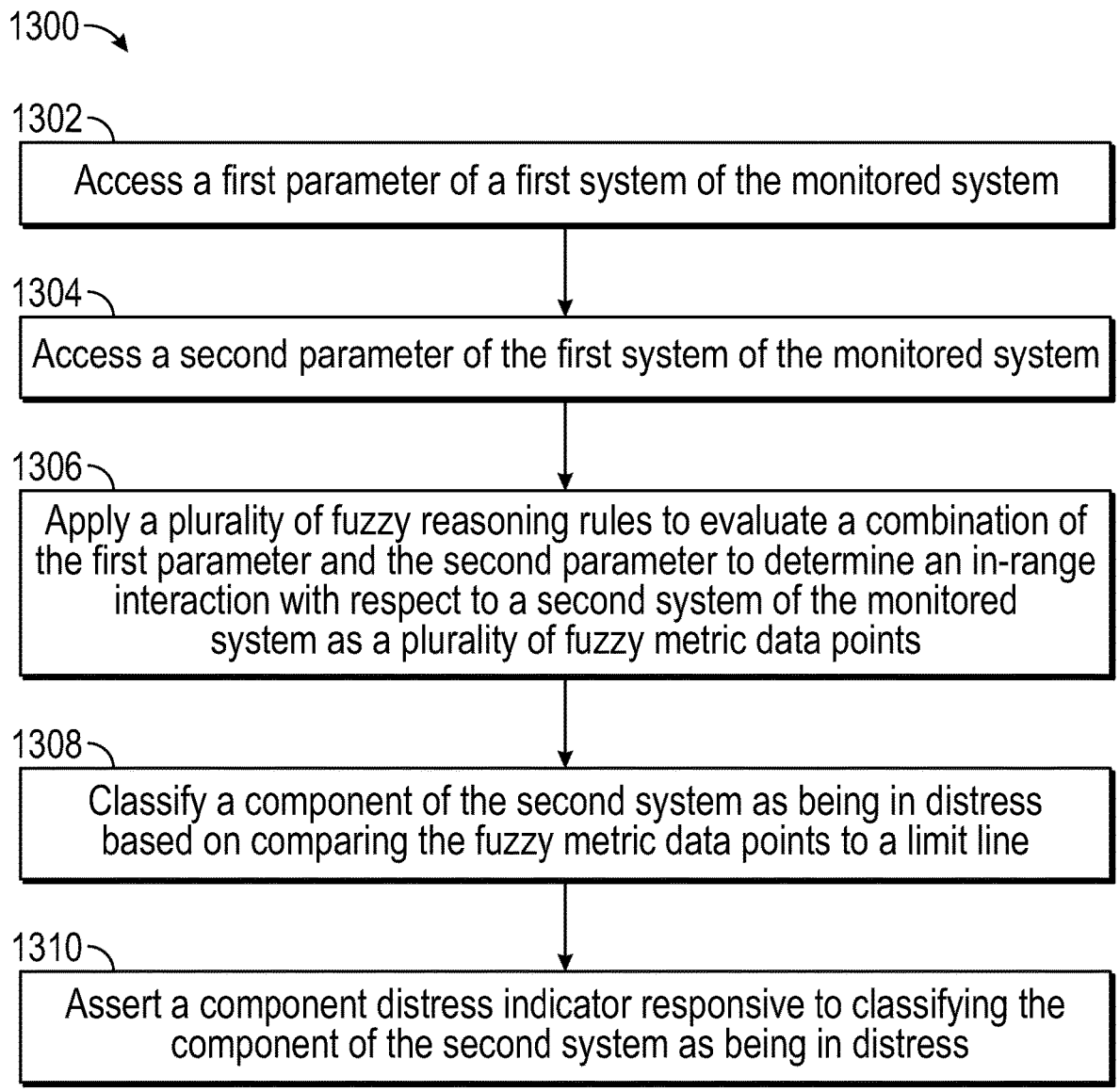
FIG. 13 is a flow chart illustrating a method, in accordance with an embodiment of the disclosure.

Referring now to FIG. 13 with continued reference to FIGS. 1-12, FIG. 13 is a flow chart illustrating a method 1300 for distress detection, in accordance with an embodiment. The method 1300 may be performed, for example, by the analysis system 122 of FIG. 1, which may be local to or remote from the monitored system 100 of FIG. 2. At block 1302, a first parameter of a first system of the monitored system 100 is accessed from the data repository 120. The monitored system 100 can be, for instance, the gas turbine engine 20 of FIG. 1.

At block 1304, a second parameter of the first system of the monitored system 100 is accessed from the data repository 120. The first parameter and the second parameter can be derived from separate sensors 106 of the monitored system 100. As one example, the first parameter can be a main oil pressure, and the second parameter can be a main oil temperature or other such values.

At block 1306, the analysis system 122 can apply fuzzy reasoning rules 406 to evaluate a combination of the first parameter and the second parameter to determine an in-range interaction with respect to a second system of the monitored system 100 as fuzzy metric data points 502-1202. The first system can be thermally cross-coupled to the second system absent a mechanical linkage, an electrical linkage, and a fluid linkage between the first system and the second system. The first system can be a lubrication system and the component of the second system can be a burner, for example. Observations of the first parameter and the second parameter can be constrained based on determining that the first parameter and the second parameter are both within a valid operating range. The first parameter and the second parameter may be normalized with respect to a third parameter, such as a level or speed indicator.

At block 1308, the analysis system 122 can classify a component of the second system as being in distress based on comparing the fuzzy metric data points 502-1202 to a limit line 500. At block 1310, the analysis system 122 can assert a component distress indicator responsive to classifying the component of the second system as being in distress. A maintenance action can be triggered responsive to the component distress indicator being asserted. The maintenance action may modify operational parameters of the monitored system 100, such as constraining operating limits, requesting a shutdown, scheduling an inspection, or other such actions. Assertion of the component distress indicator may be prevented based on detection of a fault condition associated with the first system.

While the above description has described the flow process of FIG. 13 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A distress detection system comprising:
a data repository operable to collect a plurality of sensor data from a monitored system; and
an analysis system comprising a processing system operable to:
access a first parameter of a first system of the monitored system from the data repository;
access a second parameter of the first system of the monitored system from the data repository;
apply a plurality of fuzzy reasoning rules to evaluate a combination of the first parameter and the second parameter to determine an in-range interaction with respect to a second system of the monitored system as a plurality of fuzzy metric data points, wherein the monitored system is a gas turbine engine, the first system is a lubrication system, and the component of the second system is a burner configured to combust fuel in the gas turbine engine;
classify a component of the second system as being in distress based on comparing the fuzzy metric data points to a limit line, wherein the combination of the first parameter and the second parameter of the lubrication system indicate that the burner is in distress based on the fuzzy reasoning rules while the first parameter and the second parameter of the lubrication system are in a non-failure condition; and
assert a component distress indicator responsive to classifying the component of the second system as being in distress.

2. The distress detection system of claim 1, wherein the first system is thermally cross-coupled to the second system absent a mechanical linkage, an electrical linkage, and a fluid linkage between the first system and the second system.

3. The distress detection system of claim 1, wherein the first parameter is a main oil pressure and the second parameter is a main oil temperature.

4. The distress detection system of claim 1, wherein observations of the first parameter and the second parameter are constrained based on determining that the first parameter and the second parameter are both within a valid operating range.

5. The distress detection system of claim 1, wherein the first parameter and the second parameter are normalized with respect to a third parameter.

6. The distress detection system of claim 1, wherein a maintenance action is triggered responsive to the component distress indicator being asserted.

7. The distress detection system of claim 1, wherein assertion of the component distress indicator is prevented based on detection of a fault condition associated with the first system.

8. The distress detection system of claim 1, wherein the first parameter and the second parameter are derived from separate sensors of the monitored system.

9. A method of distress detection in a monitored system, the method comprising:
   accessing, by an analysis system, a first parameter of a first system of the monitored system;
   accessing, by the analysis system, a second parameter of the first system of the monitored system;
   applying a plurality of fuzzy reasoning rules to evaluate a combination of the first parameter and the second parameter to determine an in-range interaction with respect to a second system of the monitored system as a plurality of fuzzy metric data points, wherein the monitored system is a gas turbine engine, the first system is a lubrication system, and the component of the second system is a burner configured to combust fuel in the gas turbine engine;
   classifying a component of the second system as being in distress based on comparing the fuzzy metric data points to a limit line, wherein the combination of the first parameter and the second parameter of the lubrication system indicate that the burner is in distress based on the fuzzy reasoning rules while the first parameter and the second parameter of the lubrication system are in a non-failure condition; and
   asserting a component distress indicator responsive to classifying the component of the second system as being in distress.

10. The method of claim 9, wherein the first system is thermally cross-coupled to the second system absent a mechanical linkage, an electrical linkage, and a fluid linkage between the first system and the second system.

11. The method of claim 9, wherein the first parameter is a main oil pressure and the second parameter is a main oil temperature.

12. The method of claim 9, wherein observations of the first parameter and the second parameter are constrained based on determining that the first parameter and the second parameter are both within a valid operating range.

13. The method of claim 9, wherein the first parameter and the second parameter are normalized with respect to a third parameter.

14. The method of claim 9, wherein a maintenance action is triggered responsive to the component distress indicator being asserted.

15. The method of claim 9, wherein assertion of the component distress indicator is prevented based on detection of a fault condition associated with the first system.

16. The method of claim 9, wherein the first parameter and the second parameter are derived from separate sensors of the monitored system.

* * * * *